(12) United States Patent
Furuichi et al.

(10) Patent No.: US 6,513,124 B1
(45) Date of Patent: Jan. 28, 2003

(54) METHOD AND APPARATUS FOR CONTROLLING OPERATING SPEED OF PROCESSOR IN COMPUTER

(75) Inventors: Sanehiro Furuichi, Kawasaki (JP); Toru Aihara, Yokohama (JP); Susumu Shimotono, Hadano (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,926

(22) Filed: May 14, 1999

(30) Foreign Application Priority Data

May 20, 1998 (JP) .......................... 10-138465

(51) Int. Cl.⁷ .............................. G06F 1/04; G06F 1/32
(52) U.S. Cl. .................. 713/322; 713/501; 713/601
(58) Field of Search ................. 713/300, 320, 713/322, 500, 501, 502, 600, 601

(56) References Cited

U.S. PATENT DOCUMENTS

| | | | | |
|---|---|---|---|---|
| 5,812,860 A | * | 9/1998 | Horden et al. | 713/322 |
| 5,815,693 A | * | 9/1998 | McDermott et al. | 713/501 |
| 5,996,084 A | * | 11/1999 | Watts | 713/323 |
| 6,081,901 A | * | 6/2000 | Dewa et al. | 713/300 |
| 6,119,241 A | * | 9/2000 | Michail et al. | 713/322 |
| 6,216,235 B1 | * | 4/2001 | Thomas et al. | 713/501 |
| 6,243,820 B1 | * | 6/2001 | Rosch | 713/322 |

* cited by examiner

Primary Examiner—Dennis M. Butler
(74) Attorney, Agent, or Firm—David M. Shofi; Anne Vachon Dougherty

(57) ABSTRACT

The number of executed instructions ($I_u$) in a user mode as one of performance indexes of a computer, and the total number of executed instructions ($I_t$) as one of power consumption indexes are used. These parameters have a relationship of $E = I_t/I_u$ with energy index E. An operating speed (operating frequency) of CPU is increased or decreased so that a value of the performance index may be increased within a range of the power consumption index specified by a user, or a value of the energy index E may be decreased. By doing so, power management processing may be performed, which balances the power saving with the performance.

27 Claims, 6 Drawing Sheets

METHOD AND APPARATUS FOR CONTROLLING OPERATING SPEED OF PROCESSOR IN COMPUTER

FIELD OF THE INVENTION

This invention relates to a power management technology, particularly to a method for changing an operating speed or operating frequency of a processor.

BACKGROUND OF THE INVENTION

There are many technologies to reduce power consumption by slowing down an operating speed of a processor. For instance, Japanese Published Unexamined Patent Application No. Hei 9-237132 discloses that the clock frequency is changed according to the load status of a CPU, remaining battery, and heating temperature status of the CPU, and the clock frequency is set to a proper value in accordance with such situation of the system. The load status of the CPU in the foregoing publication is determined by a driver software attached to an OS based upon how many times the CPU goes into an idle state during a certain period. That is, a flag showing a busy state is set every time the CPU accesses I/O or memory, a system controller detects the load status of the CPU by recognizing the frequency of the idle state based on the frequency of the setting of the flag.

In addition, Japanese Published Unexamined Patent Application No. Hei 9-22317 (a counterpart application of U.S. patent application Ser. No. 395,335, filed on Feb. 28, 1995) discloses a real time power-saving and heat controlling unit for a portable computer, wherein a monitor supervises whether a CPU can pause according to an activity of the CPU and a real time sample of a temperature level. In that application, a hardware selector reduces clocked time of the CPU if the CPU can pause, and returns the CPU to a previous high-speed clock level if the CPU is active. The monitor adjusts a performance level of the computer, and implements the power saving and the temperature control in response to the CPU activity and the real time sampling of temperature.

Also, Japanese Unexamined Patent Publication No. Hei 9-305569 (a counterpart application of U.S. patent application Ser. No. 010,135, filed on Jan. 17, 1996) discloses that, to dynamically perform power saving and power management by detecting dynamic operating characteristics of a CPU of a portable computer and estimating its activity level, at least one dynamic CPU operating characteristic is detected while the CPU is operating in a first and it is determined whether the CPU operating characteristic establishes a predetermined relationship to a predetermined set point related to the characteristic (whether there exists a set point interrupt condition) so that the first clock is changed to adjust the predetermined set point if there exists the set point interrupt condition. It also discloses that the decision of whether or not the CPU enters a calcuLation-oriented mode with little I/O is made by counting the number of instructions and deciding their types.

However, the background art does not disclose all of the algorithms to control operating speed of a processor by referring to an index related to a computer's performance (referred to as "performance index") and an index related to a power consumption (referred to as "power consumption index"). Also, it does not disclose any algorithm for controlling an operating speed of a processor, which refers to an energy index represented by a ratio of values of the power consumption index and the performance index.

Accordingly, an object of the present invention is to provide a new method to control the operating speed of a processor by referring to a performance index. It may also refer to a power consumption index in addition to the performance index.

It is also an object to provide a method to control the operating speed of a processor, which refers to an energy index.

Yet another object is to provide a method for controlling the operating speed of a processor, which uses the number of instructions in a user mode executed by the processor per a unit period as a performance index.

Furthermore, it is also an object to provide a method for controlling the operating speed of a processor, which uses the total number of instructions executed by the processor per a unit period as a performance index.

SUMMARY OF THE INVENTION

A first aspect of the present invention is a method for controlling the operating speed of a processor in a computer. This method includes the steps of: measuring a value of a first performance index during a first predetermined period; changing the operating speed of the processor; measuring a value of a second performance index during a second predetermined period; and by referring to values of the first and second performance indexes, changing the operating speed of the processor. Thus, by measuring a value of the performance index before and after a change of operating speed and using the results of measuring, it is possible to change the operating speed of a processor according to a changing trend of the performance index, for instance, to increase performance as much as possible under a predetermined condition. Meanwhile, the operating speed has almost the same meaning as that of an operating frequency. If an actual frequency cannot be controlled, an operating period and a non-operating period are set so that substantial operating speed or a substantial operating frequency is changed by controlling the ratio of them.

It is also possible to include the steps of: measuring a value of a power consumption index during a third predetermined period, and changing the operating speed of the processor based on a value of the power consumption index. For instance, it is also possible to set the operating frequency by a value of a power consumption index.

A second aspect of the present invention comprises the steps of: measuring values of a performance index and a power consumption index; by referring to a ratio of values of the performance and the power consumption indexes, changing a policy for changing the operating speed of a processor; and by referring to the policy, changing the operating speed of the processor. This is to change an operating speed of the processor by using the aforementioned energy index or its reciprocal. The policy change may be, for instance, at a case of performing the process of changing an operating speed all over again in the event of a high rate of change of the energy index or a case where a reciprocal of the energy index is segmented by a predetermined value and the process of changing an operating speed defined for each segment is performed.

Furthermore, a third aspect of the present invention comprises the steps of: measuring values of a performance and a power consumption indexes; calculating a value of an energy index from values of the performance and the power consumption indexes; and changing the operating speed of a processor to reduce a value of the energy index. Reducing the energy index means more power saving and higher performance (less sacrificed performance), which leads to more efficient power management.

Moreover, a fourth aspect of the present invention, which uses the number of executed instructions in a user mode by the processor, comprises the steps of: counting the number of executed instructions ($I_u$) in a user mode during a first predetermined period; and, by referring to the $I_u$, changing operating speed of the processor. The number of executed instructions in a user mode is an example of a performance index, and if a larger number of instructions in a user mode are executed, task performance becomes higher from a user's viewpoint. Accordingly, an operating frequency is changed to increase the number of executed instructions in a user mode. Even if an operating frequency is raised, however, the number of executed instructions in a user mode does not always increase accordingly.

After performing the above changing step, the $I_u$ may be counted again and the changing step may be performed again. By doing so, effect of a change of an operating speed can be fed back.

The invention may also comprise the steps of: counting the number of executed instructions ($I_{u2}$) in a user mode during a second predetermined period; and if a rate of change from $I_u$ to $I_{u2}$ is higher than a predetermined value, setting an operating speed of the processor to a predetermined value. By doing so, a change of the type of a task being executed by the processor is detected.

It may also further comprise a step of counting the total number of executed instructions ($I_t$) during the second predetermined period. The total number of executed instructions is one of the power consumption indexes and it is possible to control an operating speed by using this count value. There may be a case where the number of executed instructions in a user mode is relatively small compared with the total number of executed instructions. In this case, a user task is not so much executed, so there is a room for change of operating speed in terms of task performance from a user's viewpoint.

Accordingly, it is also possible to make the first and the second predetermined periods the same and execute a step of switching a change control mode or a change control flow of an operating speed by referring to a ratio of $I_t$ and $I_u$. For instance, it is also possible to divide a user instruction oriented mode and a system instruction oriented mode by the ratio of $I_t$ and $I_u$, or switch a change control flow by a rate of change of the ratio of $I_t$ and $I_u$.

It is also possible to change operating frequency by the ratio of $I_t$ and $I_u$ and recount $I_t$ and $I_u$ in a changed state to feed back an effect of change of operating frequency.

The invention may also comprise the steps of counting the number of executed instructions ($I_u$) in a user mode during a predetermined period; counting the total number of executed instructions ($I_t$) during the predetermined period; and by referring to the ratio of $I_t$ and $I_u$, changing the operating speed of the processor. In that case it may also comprise the steps of switching a policy for changing the operating speed; and by referring to the policy, changing the operating speed of the processor.

DESCRIPTION OF THE DRAWINGS

The invention will now be described in greater detail with specific reference to the appended drawings wherein.

DESCRIPTION OF THE PREFERRED EMBODIMENT

Figure 1:
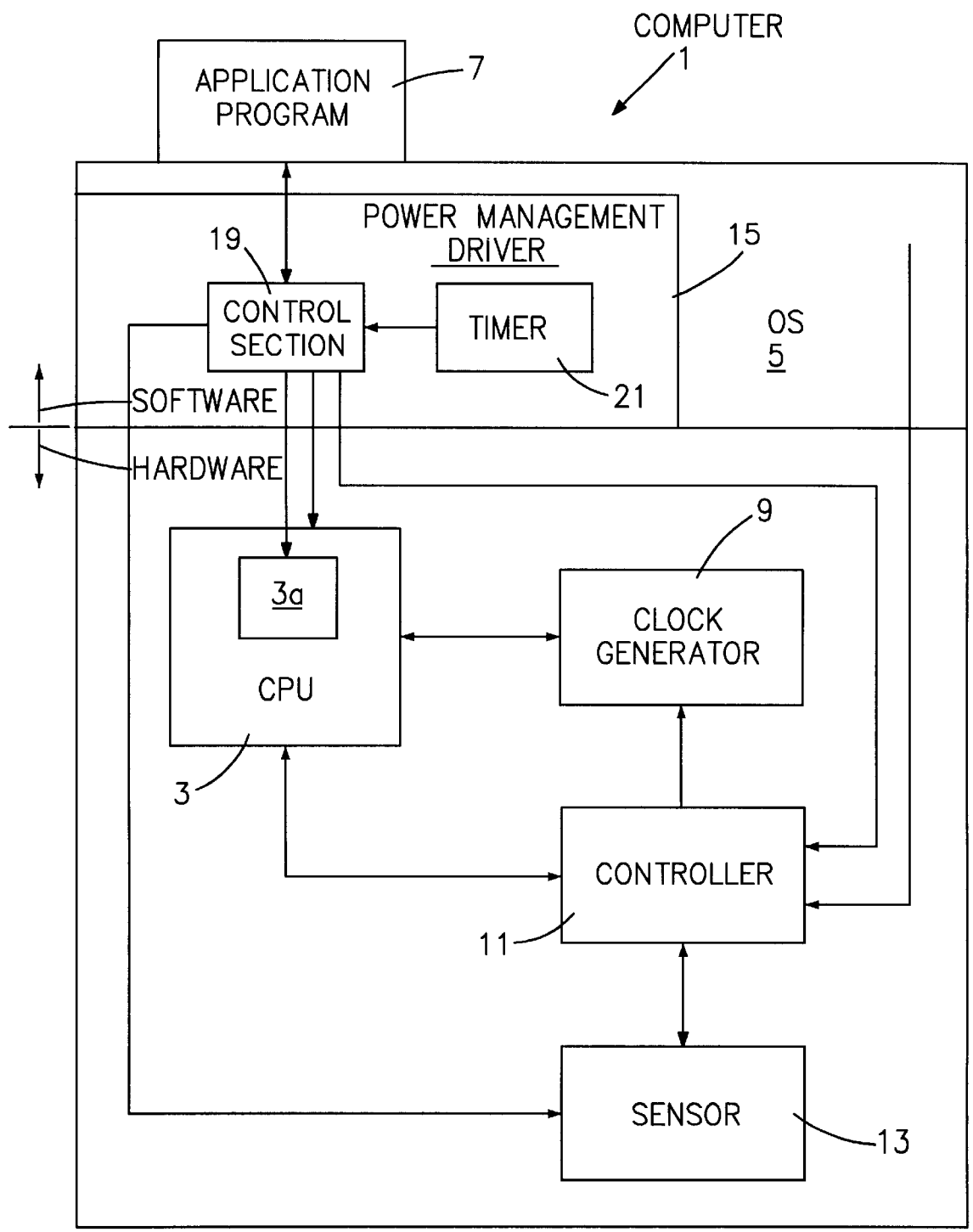
FIG. 1 is a block diagram showing a sample apparatus configuration of the present invention.

FIG. 1 shows an example of configuration of computer 1 related to the portion associated with the present invention. The hardware portion of computer 1 comprises CPU (central processing unit) 3, clock generator 9, controller 11 and sensor 13. A sensor may be a temperature sensor, an ampere meter or a wattmeter. Sensor 13 is not required if necessary information can be obtained otherwise. Also, the software portion of computer 1 comprises OS (operating system) 5 and application program 7, and OS 5 comprises power management driver 15. This power management driver 15 comprises control section 19 and timer 21.

When performing the present invention only by hardware, a clock signal which is input into CPU 3 is controlled by controller 11. Control of a clock signal is performed by changing the frequency of the clock signal or stopping supply of the clock signal if CPU 3 can deal with the change or stop. If these are impossible, it is implemented by controller 11 ordering CPU 3 to stop operation for a predetermined period while supplying a predetermined clock signal. Moreover, if CPU 3 generates an internal clock from a clock signal of the clock generator 9, the frequency of the internal clock may be changed by changing a method for generating an internal clock. Controller 11 observes operation of CPU 3 and monitors input from sensor 13. Observation for CPU 3 may be, for instance, a cache miss rate, the number of access to a non-cacheable memory, an I/O instruction rate, etc., the total number of executed instructions and the number of executed instructions in user mode per unit period. An instruction in the user mode is an instruction executed in a state where the privilege level of CPU 3 is the lowest, to which most of the instructions included in frames of general application programs such as GUI or arithmetic operation belong. On the other hand, I/O instructions, etc. are executed in a system mode as distinguished from the user mode. Also, information of hardware usage from OS 5, and information of hardware usage directly obtained from application program 7 via OS 5 or not via OS 5, are also acquirable. By using such information, controller 11 controls operation of the clock generator 9 and CPU 3. Operation of controller 11 is mentioned later. Moreover, it is also possible to build controller 11 itself into CPU 3.

In the event of implementing the present invention only by software, control section 19 of power management driver 15 accesses to CPU 3 and detects, for instance, the total number of executed instructions and the number of executed instructions in the user mode per unit period. It is also possible to obtain results of the measurement from sensor 13. It is also possible to acquire information of hardware usage from application program 7 and information of hardware usage from other portions of OS 5. Control section 19 controls an operating speed of CPU 3 based on such acquired information. This control is performed by controlling an output clock signal of clock generator 9 via controller 11 or outputting a Halt instruction to CPU 3. It is for instance, that timer 21 periodically (244 μs, for instance) has control section 19 interrupted, and control section 19 outputs the Halt instruction to CPU 3 at a rate set according to collected information. For instance, if it is decided that operating speed of CPU 3 is ¼, the Halt instruction is output at three interrupts out of four (it stops operation of CPU 3), and processing is performed by CPU 3 at one interrupt.

As regards a Pentium (trademark of Intel Corp.) processor, which is often used for a personal computer, the above-mentioned total number of executed instructions and the number of executed instructions in the user mode per unit period are acquirable from Model Specific Register 3a (MSR), which is an internal register (see Intel Pentium Processor Family Developer's Manual Vol. 1: Pentium Processor, (1995) pp. 33–1 to 33–25). Accordingly, controller 11 and control section 19 can read this register. As cumulative values are stored in an MSR, in actuality the changed quantity of the value stored in register 3a is used. As regards a unit period, a value stored in a Time Stamp Register (TSR) which is a kind of MSR may be used. In a TSR, a value calculated by adding one for each clock of CPU 3 is stored, and the total number of executed instructions or the number of executed instructions in the user mode per unit period is acquirable by dividing the changed quantity of the total number of executed instructions or the changed quantity of the number of executed instructions in the user mode by the changed quantity of the value stored in the TSR.

In the present invention, the following indexes are employed in the control of an operating speed of CPU 3 performed by controller 11 and control section 19.

P: power consumption index (power consumption (W) of a processor)

V: performance index (problem size of a task processed per a unit period (computing speed))

T: time required for processing a given problem (V=1/T)

E: energy index

An energy index is represented by E=P/V (or E α P/V). Generally, as P becomes larger, V also increases. Namely, if CPU 3 is operated quickly to increase power consumption, processing speed also increases. However, I/O instruction rate, cache miss rate, etc. are different for each task, and there is a case, depending on a task, where V gradually saturates against P's increase, so that increase of the operating speed of CPU 3 does not necessarily lead to higher performance. In this case, it is more efficient to operate the CPU at a speed which makes energy index E smaller from viewpoints of both performance and power saving. On the other hand, depending on the user, there are cases where increase of performance within a range of predetermined power consumption is desired. In such a case, it is controlled so that performance index V becomes higher.

Meanwhile, information to be used as a power consumption index can be the total number of executed instructions within a predetermined period, calories calculated from a temperature if sensor 13 is a temperature sensor, a measured current value if sensor 13 is an ampere meter, a measured power value if sensor 13 is a wattmeter, etc. Also, a performance index can be, for instance, the number of executed instructions in a user mode within a predetermined period, a cache miss rate, the number of access to non-cacheable memory, an I/O instruction rate, and information of hardware usage from OS 5 or application program 7 (for instance, CPU occupation rate for each task, priority of processes, requests of application programs, or combinations of those). An energy index is acquired from the above-mentioned expression.

The following is a control flow wherein the values of performance indexes and power consumption indexes as above are acquired to achieve the objectives by using them.

(1) A Processing Flow for Decreasing Energy Index E (a) First Example

Figure 2:
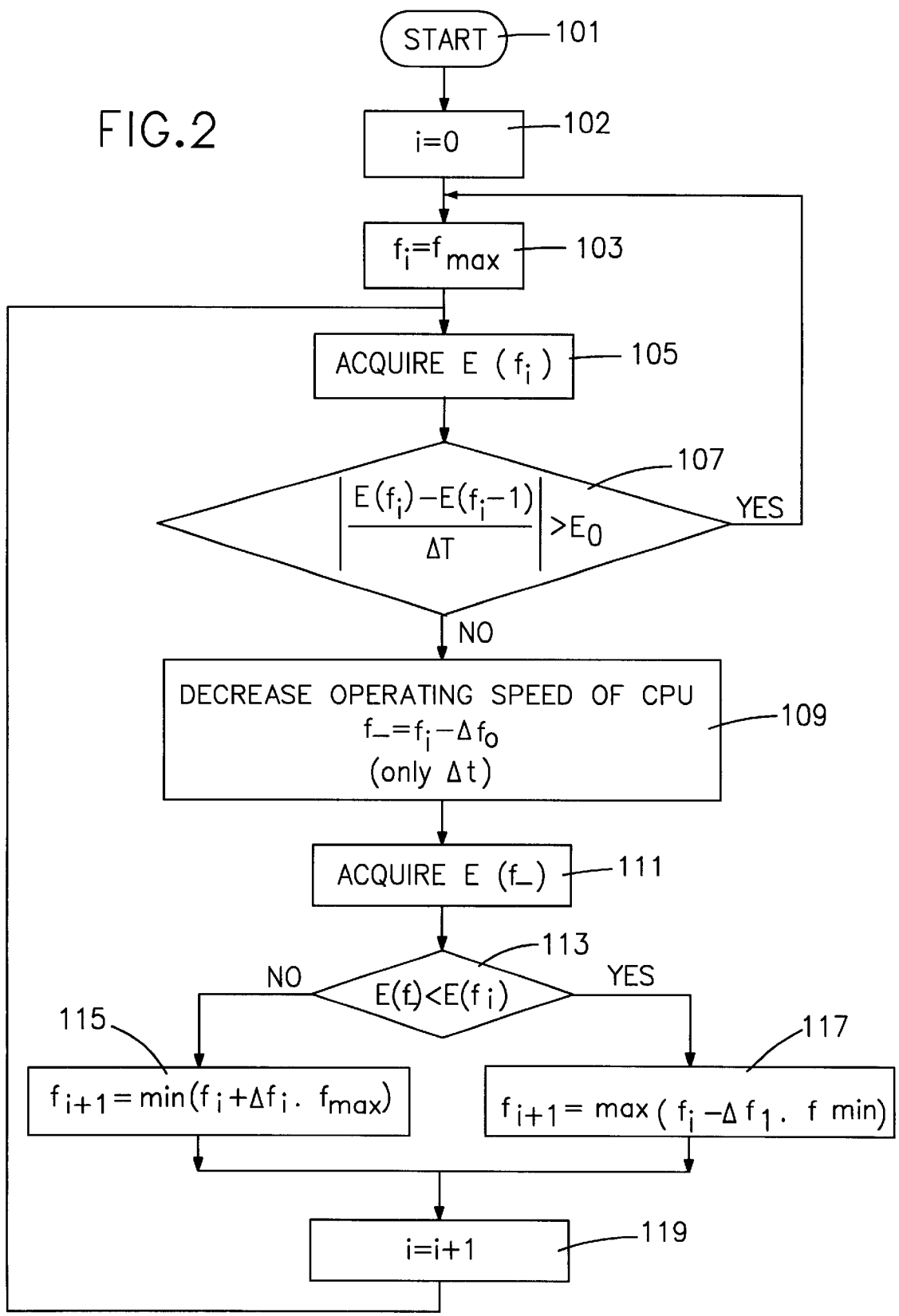
FIG. 2 is a flowchart showing a first processing for decreasing an energy index.

The first example of a processing flow for the purpose of minimizing energy index E is shown in FIG. 2. First, an operating speed $f_i$ of CPU 3 (i indicates the number of repetitions in FIG. 2) is set to the maximum value $f_{max}$ (step 103). Then, energy index E ($f_i$) at the time is acquired (measured) (step 105). As aforementioned, performance index V and power consumption index P are measured and acquired by calculation. If —($E(f_i)$—$E(f_{i-1})$)/$\Delta T$— exceeds predetermined threshold $E_0$ (the changed quantity of energy index E exceeds threshold $E_0$), it is determined that the property of a task executed by the CPU has changed and processing is returned to step 103. Thus, a processing flow for changing an operating speed of CPU 3 is switched by referring to energy index E. Meanwhile, $\Delta T$ is an execution interval of the loop from step 105 to the next step 105 in FIG. 2 which is, for instance, around a few hundred μs.

If the property of the task has not changed (the first process in FIG. 2 definitely has not changed because there is no $f_{i-1}$), the operating speed of CPU 3 is set to $f\_=f_i-\Delta f_0$ only during $\Delta t$ (an operating speed is lowered by $\Delta f_0$. Step 109). As $\Delta t$ is a period for temporarily adjusting an operating speed of CPU 3, it is, for instance, around a few tens of μs. Then, energy index $E(f\_)$ is acquired again (step 111), and it is determined whether or not $E(f\_)<E(f_i)$ is met (step 113). If it is met, since an operating speed of CPU 3 had better be decreased, $f_{i+1}=f_i-\Delta f_1$ is established unless $f_i$ is already $f_{min}$ (the speed is decreased by $\Delta f_i$. Step 117). On the other hand, if the condition of step 113 is not met, since decrease of an operating speed of CPU 3 badly affects energy index E, $f_{i+1}=f_i+\Delta f_1$ is established unless $f_i$ is already $f_{max}$ (the speed is increased by $\Delta f_1$. Step 115). Thus, in the first example, a policy for changing an operating speed of CPU 3 is decided by referring to the value of E. Also, while $\Delta f_1$ is a larger value than $\Delta f_0$ in this example, they may be the same. Then, i is incremented by 1 and it returns to step 105 (step 119). By performing this process repeatedly, an operating speed (or a driving frequency) f of CPU 3 is changed to minimize energy index E.

(2) Second Example

Figure 3:
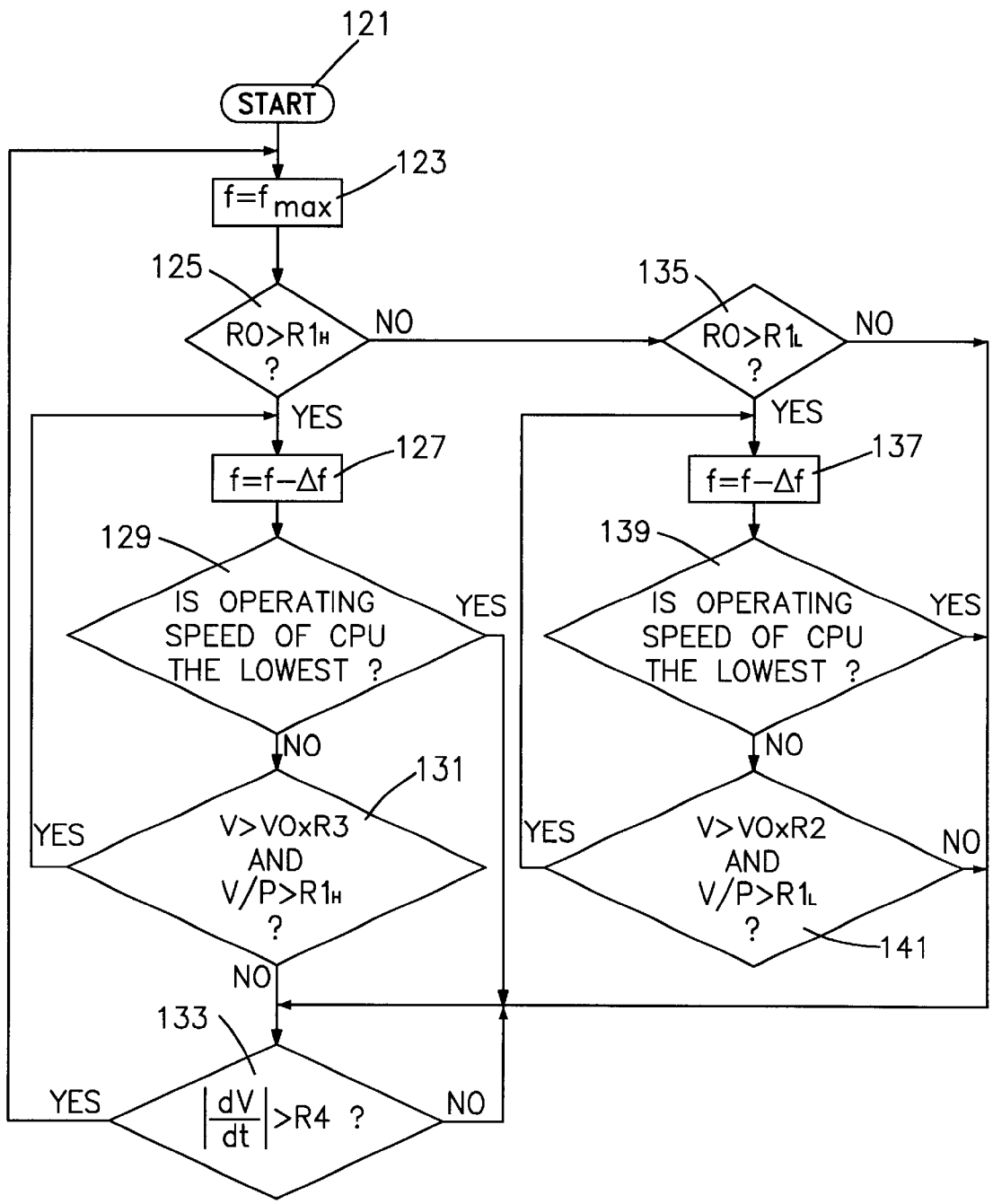
FIG. 3 is a flowchart showing a second processing for decreasing an energy index.

FIG. 3 shows a processing flow for decreasing energy index E. In this processing flow, energy index E does not become the lowest but the energy index E is within a certain acceptable range. In the second example, a value of V/P=1/E=R is introduced. In the event of processing by using the total number of executed instructions $I_t$ and the number of executed instructions $I_u$ in a user mode per unit period, R indicates the rate of executed instructions in a user mode, and if it is higher than predetermined threshold $R1_H$, it can be said that CPU 3 is in a user instruction oriented state. Also, if R is lower than predetermined threshold $R1_L$, it can be said that CPU 3 is in a system instruction oriented state.

First, an operating speed f of CPU 3 is set to $f_{max}$ (step 123). Then, it is determined whether or not the value R0 of R when f is $f_{max}$ exceeds a predetermined threshold $R1_H$ (step 125). If it does not exceed, it is determined whether or not R0 is smaller than a predetermined threshold $R1_L$ (step 135). If R0 is equal to or more than the predetermined threshold $R1_L$, R0 is $R1_L \leq R0 \leq R1_H$ and energy index E is within an acceptable range, so it moves on to step 133 since no more control is required.

On the other hand, if R0 is larger than $R1_H$, an operating speed f of CPU 3 is decreased only by $\Delta f$ (step 127). If operating speed so decreased is the lowest operating speed, it moves on to step 133 (step 129). If not so, performance index V and power consumption index P are measured at the decreased operating speed, and it is determined whether or not they are V>V0*R3 and V/P>$R1_H$ (step 131). The first expression defines an acceptable range of performance index V which is lowered when the operating speed of CPU 3 is decreased, and is a ratio against performance index value V0 when the operating speed was $f_{max}$. On the other hand, the second expression is for determining whether or not R=V/P remains within a range of threshold $R1_H$ in step 125 after the operating speed of CPU 3 is decreased. In the event of processing by using the total number of executed instructions It and the number of executed instructions $I_u$ in the user mode per unit period, it is determined whether or not it is still in a user instruction oriented state after decreasing operating speed. If the first and the second expressions are satisfied, operating speed of CPU 3 is further decreased. On the other hand, if either the first or the second expression is not satisfied, it moves on to step 133 being fixed at that operating speed.

Also, if R0/$R1_L$ is satisfied (step 135), an operating speed f of CPU 3 is decreased by $\Delta f$ (step 137). If operating speed so decreased is the lowest operating speed, it moves on to step 133 (step 129). If not so, performance index V and power consumption index P are measured at the decreased operating speed, and it is determined whether or not they are V>V0*R2 and V/P<$R1_L$ (step 131). The first expression defines an acceptable range of performance index V when an operating speed of CPU 3 is decreased, and is a ratio against performance index V0 when the operating speed was $f_{max}$. On the other hand, the second expression is for determining whether or not R=V/P remains within a range of threshold $R1_L$ in step 135 after the operating speed of CPU 3 is decreased. In the event of processing by using the total number of executed instructions $I_t$ and the number of executed instructions $I_u$ in the user mode per a unit period, it is determined whether or not it is still in a system instruction oriented state after decreasing operating speed. If the first and the second expressions are satisfied, the operating speed f of CPU 3 is further decreased. On the other hand, if either the first or the second expression is not satisfied, it moves on to step 133 being fixed at that operating speed.

As above, in the second example, a change processing mode (a policy for change) of an operating speed of CPU 3 is set by using $R1_H$ and $R1_L$ and processing is based on it. $\Delta f$ in steps 127 and 137 may be either the same value or different values.

In step 133, an absolute value of a rate of change of performance index V is examined. Namely, it is determined whether or not the absolute value of the rate of change of performance index V has exceeded a predetermined threshold R4. This process is performed periodically or as required, and as long as this condition is not met, CPU 3 is operated at the same operating speed. When this condition is met, it returns to step 123 determining that the type of a task to be processed by CPU 3 was (hanged. It may also be considered that a processing flow was changed by performance index V. $R1_H$ and $R1_L$ may be the same value. R2 and R3 may also be the same. These constants and R4 may be fixed, or depending on a case, changed to dynamic.

Both the first and the second examples are processing flows which are performed by paying attention to energy index E (more generally, a ratio of performance index and power consumption index P).

(2) A Processing Flow for Increasing Performance Index V (a) First Example

Figure 4:
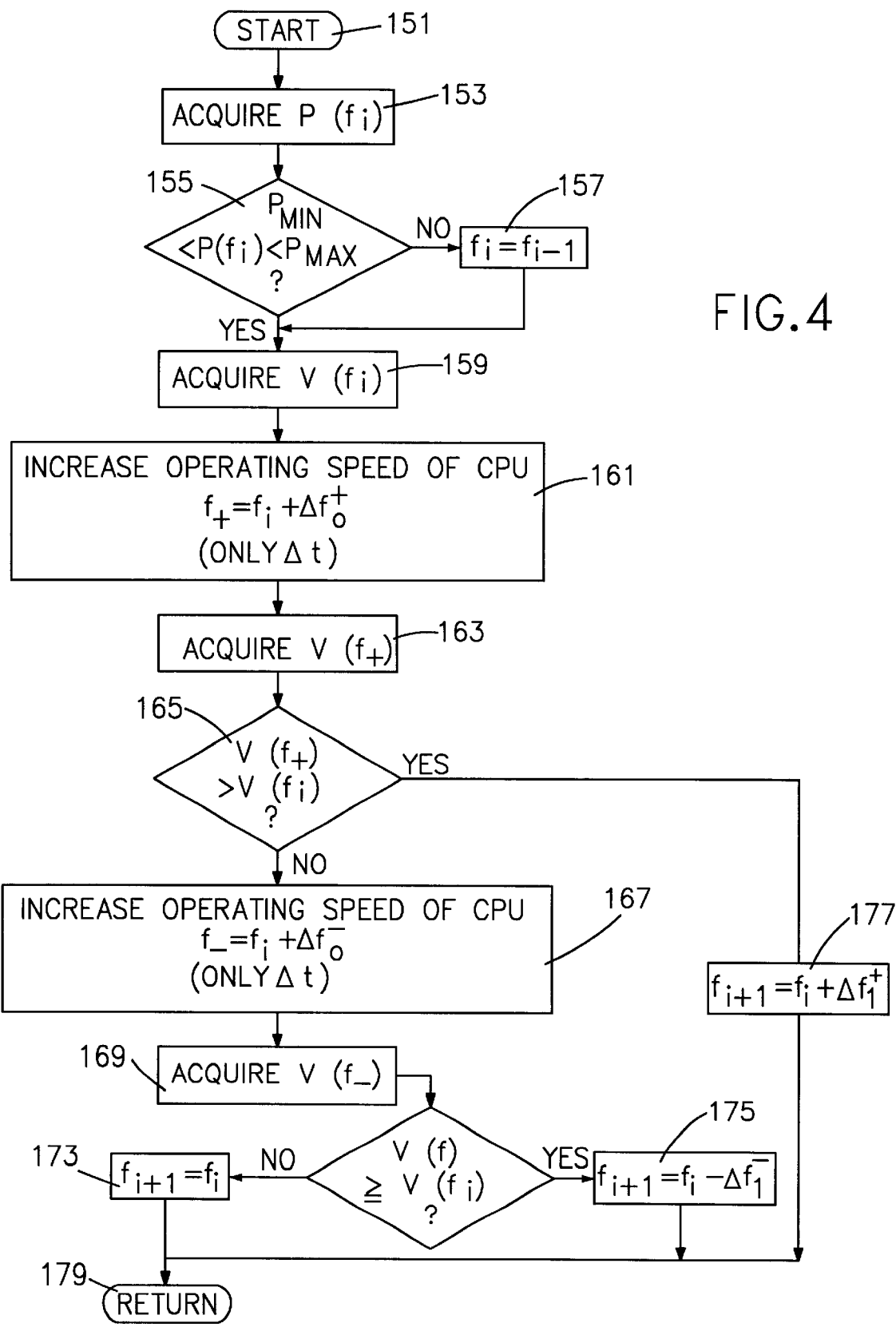
FIG. 4 is a flowchart showing a first processing for increasing a performance index.

Energy index E is not used in this example. However, it includes a process of changing the operating speed of CPU 3 by using power consumption index P. The initial value P($f_1$) of the operating speed of CPU 3 is set at the possible maximum value $f_{max}$. First, power consumption index P($f_1$) at operating speed $f_i$ is acquired (step 153). A suffix of f represents the number of iterations of processing in FIG. 4. Then, it is determined whether or not P($f_1$) is between $P_{min}$ and $P_{max}$ specified by a user (step 155). If it is equal to or more than $P_{max}$, or equal to or less than $P_{min}$, $f_i$ is once returned to $f_{i-1}$ (the operating speed when processing of FIG. 4 was started last time) since these are the cases where the change to $f_i$ was inadequate or the property of the task was changed after setting of $f_i$ (step 157).

After step 155 or step 157, performance index V($f_i$) at $f_i$ is acquired (step 159). Then, the operating speed of CPU 3 is increased by $\Delta f_0^+$ only during $\Delta t$ (step 161). Namely, it is set as $f_+=f_i+\Delta f_0^+$. After that, performance index V($f_+$) at $f_+$ is acquired (step 163). If V($f_+$)>V($f_i$) (step 165), it is set as $f_{i+1}=f_i+\Delta f_1^+$ since the value of performance index V is increased by increasing an operating speed of CPU 3 (step 177). On the other hand, if V($f_+$)>V($f_i$), an operating speed of CPU 3 is decreased by $\Delta f_0-$ only during $\Delta t$ (step 167). Namely, $f\_=f_i-\Delta f_0-$ is set. Then, performance index V($f\_$) at f is acquired (step 169). After that, it is determined whether V($f\_$)>V($f_i$) (step 171). If this condition is not met, it is set as $f_{i+1}=f_i$ since the performance remains unchanged without changing the operating speed of CPU 3 (step 173). On the other hand, if it is not V($f\_$)>V($f_i$), $f_{i+1}=f_i-\Delta f_1-$ is set (step 175).

The above processing is performed at predetermined intervals or as required. In accordance with a power saving index specified by a user, both power saving and performance can be balanced. Meanwhile, $\Delta f_0^+$ and $\Delta f_0^-$ are respectively considered to be smaller than $\Delta f_1^+$ and $\Delta f_1^-$ in the first example, but they may be the same value. Also the superscript suffixes + and − may be either the same value or different values.

(b) Second Example

Figure 5:
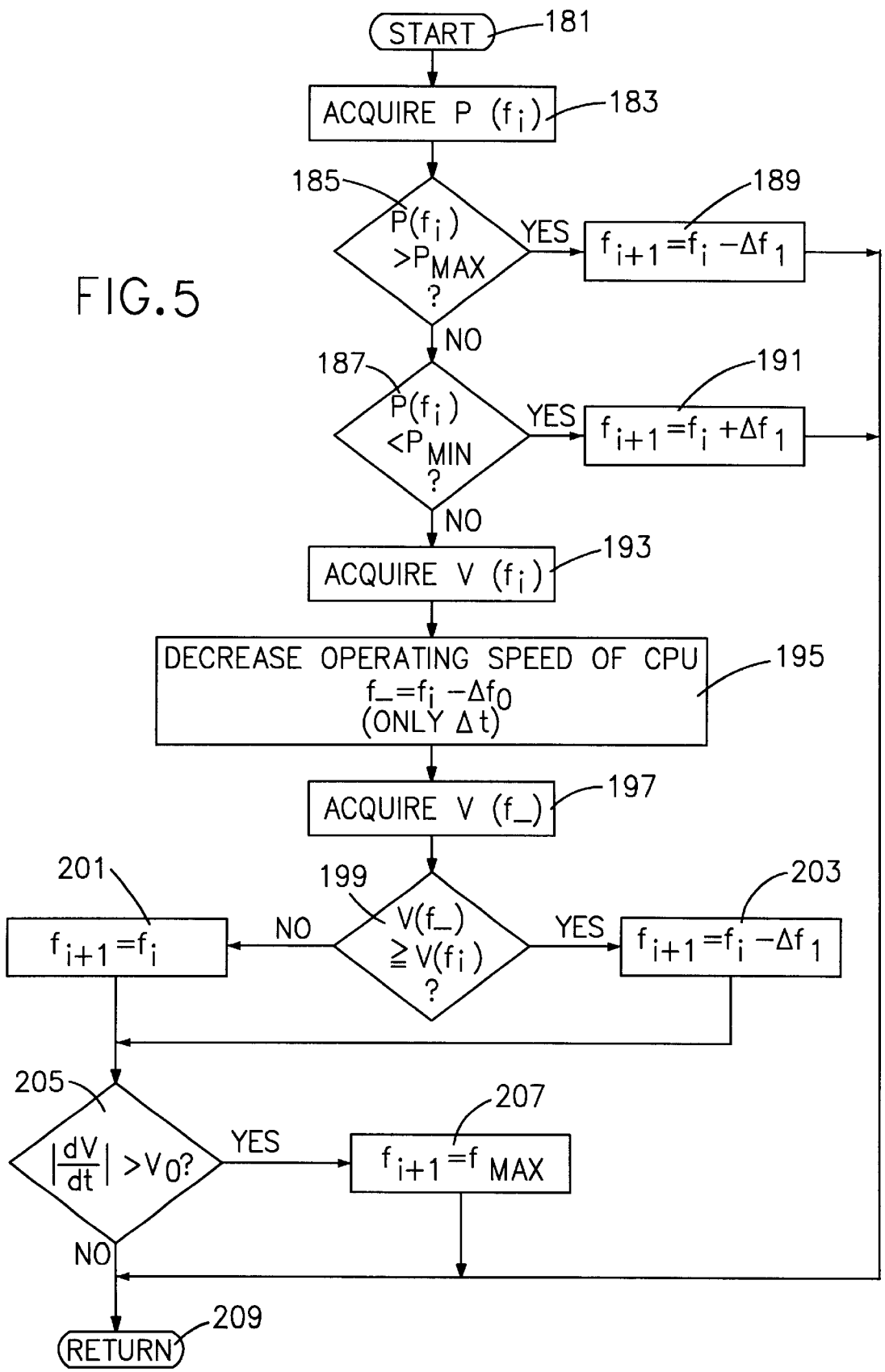
FIG. 5 is a flowchart showing a second processing for increasing a performance index.

FIG. 5 shows a second example of a processing flow for increasing performance index V. In the second example, a processing flow for changing operating speed is switched in consideration of a rate of change of performance index V. Meanwhile, the processing shown in FIG. 5 is a repeating process at i-th time. This process is executed repeatedly at a predetermined interval or as required. The initial value P($f_1$) of the operating speed of CPU 3 is set at the possible maximum value $f_{max}$.

First, power consumption index P($f_1$) at the set operating speed $f_i$ of CPU 3 is acquired (step 183). Then, it is compared with $P_{max}$ specified by a user (step 185). If P($f_1$) is larger than $P_{max}$, $f_{i+1}=f_i^-\Delta f_1$ is set in order to decrease power consumption (step 189). Also, $P_{min}$ specified by a user is compared with P($f_1$) (step 187), and if it is smaller than $P_{min}$, $f_{i+1}=f_i+\Delta f_1$ is set since the operating frequency of CPU 3 may be increased in order to increase a value of performance index (step 191).

If the conditions of both steps 185 and 187 are not satisfied, the operating speed of CPU 3 can be controlled. Accordingly, performance index $V(f_i)$ at $f_i$ is acquired (step 193). Next, an operating speed of CPU 3 is decreased by $\Delta f_1$ only during $\Delta t$ (step 195). Accordingly, $f\_=f_i-\Delta f_0$ is set. Then, performance index $V(f\_)$ at $f\_$ is acquired (step 197). It is determined whether $V(f\_) \geq V(f_i)$ by using the acquired performance index (step 199). If this condition is not met, it is set as $f_{i+1}=f_i$ since the operating speed of CPU 3 does not need to be changed (step 201). On the other hand, if it meets the condition of step 199, $f_{i+1}=f_i-\Delta f_1$ is set (step 203). Then, the rate of change of performance index V is examined. This is calculated by $-(V(f_i)-V(f_{i-1}))/dt-$. If the result exceeds a predetermined $V_0$, $f_{i+1}$ is set to the possible maximum value $f_{max}$ (step 207) as determined that the type of a task being processed by CPU 3 was changed. If the type of a task was not changed, processing is terminated leaving it as set at step 203 or step 201 (step 209). By performing the above processing, both the power consumption index specified by a user and performance can be balanced. Meanwhile, $\Delta f_0$ is considered to be smaller than $\Delta f_1$ in the second example, but they may be the same value.

(3) Third Example

This example is an algorithm developed from FIG. 5. First index J which is normalized by V/P as $J=(dV/dP)/(V/P)$. In addition, the minimum value $J_{min}$ of this J is defined. If J is a value larger than 1.0 or around 1.0, when more power is supplied, J's numerator does not decrease and J itself also increases. Thus it shows that performance may be improved when more power is supplied. On the other hand, if J is smaller than 1.0 ($J<J_{min}$), it indicates that J's numerator decreases and does not lead to improved performance even when more power is supplied.

Furthermore, index S which is $S=-V_i/P_i-V_0/P_0-/(V_0/P_0)$ is introduced in order to detect any change of task characteristics. In this case, $V_i$ and $P_i$ are respectively the initial values. $V_i$ and $P_i$ are respectively the latest V and P. Threshold $S_{max}$ for detecting any change of task characteristics is also defined.

In addition, index Count is also introduced for counting the number of executions of each task when the operating speed of a processor is the highest. This is used in order to prevent changing the operating speed of a processor before a task is in a stable state or changing an operating speed too often. Accordingly, a threshold for determining that a task is in a stable state is C.

Figure 6:
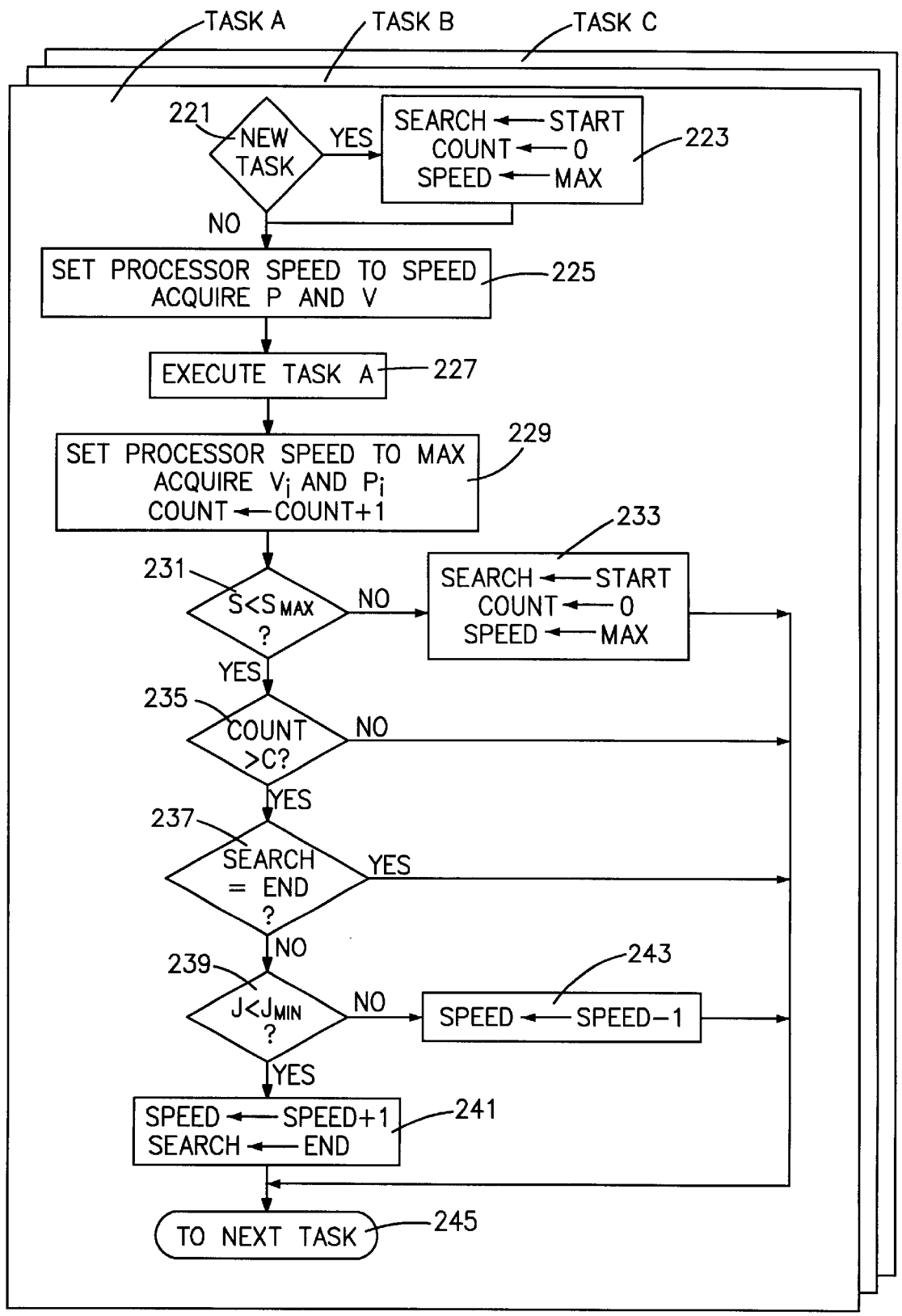
FIG. 6 is a flowchart showing a third processing for increasing a performance index.

FIG. 6 shows an example of an algorithm for adjusting the operating speed of a processor by using these indexes. As shown in FIG. 6, this algorithm is performed for each task, and each variable is saved for each task. First, it is determined whether this task A is a new task (step 221). If it is a new task, variable Search representing a processing state is set to a start status, the aforementioned Count is set to an initial value 0 and the operating speed (Speed) of a processor is set to maximum speed MAX (step 223). If task A is not a new task, the variable value decided for task A last time is fetched. Operating speed of the processor is set to Speed and then measuring of P and V is started (step 225). Then, task A is executed (step 227). If task A is a new task, P and V acquired here become $P_0$ and $V_0$ and it switches to a next task.

After that, the processor speed is set to maximum speed MAX and $V_i$ and $P_i$ at the time ($V_{count+1}$ and $P_{count+1}$) are measured. In addition, Count is incremented by 1 (step 229). Then, it is determined whether or not $S<S_{max}$ (step 231). If not $S<S_{max}$, as a task characteristic has changed, variable Search is set to a start status, Count is returned to an initial value 0 and an operating speed of a processor Speed is set to maximum speed MAX (step 233). On the other hand, if no task characteristic has changed, it is determined whether or not a current Count value is larger than threshold C (step 235). If Count value is smaller than threshold C, as the task is not yet in a stable state, a following process is not executed and it is switched to a next task (step 245). If the task is in a stable state, it is examined whether variable Search representing a processing state represents End (step 237). This End represents that the operating speed of a processor is already adjusted. Accordingly, if Search=End, it is switched to a next task.

If not so, it is determined whether or not $J<J_{min}$ (step 239). If it does not meet this condition, the operating speed of the processor may be reduced, so Speed is set to decrease the speed by one step ($\Delta f$) (step 243). Namely, Speed=Speed−1. Then, it is switched to a next task. On the other hand, if it does not meet the condition of step 239, the speed cannot be further reduced, so it is returned to the previous operating speed of the processor (Speed=Speed+1), and processing state Search is changed to ending state End (step 241). After this, it is switched to a next task.

The above processing is performed by a scheduler of an OS which performs switching of tasks. It may also cooperate with the above-mentioned power management driver.

Processing as above is performed by controller 11 or control section 19 within power management driver 15. The block diagram in FIG. 1 is merely an example, and timer 21, for instance, is set in power management driver 15. However, a timer located in another part of OS 5 or the hardware's timer may be used. In addition, it is possible to have CPU 13 include a sensor itself. Controller 11 of the present invention may be implemented either on a chip together with other peripheral circuits or separately. While there is only one application program 7 in FIG. 1, there are naturally cases where many application programs are executed. In FIG. 1, there are only the portions considered necessary as to the lines for reference between functional blocks. However, it is also possible to set references between functions which are not shown in FIG. 1.

Also, the algorithm shown in FIG. 2 to FIG. 6 is only an example. As long as it is algorithm which can adjust an operating speed of CPU 3 according to the purpose, it may be different from that in FIG. 2 to FIG. 6. Also, if OS 5 comprises other power management functions (for instance, APM (Advanced Power Management) driver), cases may arise where it must be adjusted to them.

As above, the aspects of the present invention were explained in a form of a processing flow, while it is also possible to implement the present invention by using an electronic circuit or other apparatus for executing each process. Particularly, a circuit for counting $I_t$ and $I_u$ may be self-contained in a processor. It is also possible to create a program for performing the steps required for the present invention. This program may be created so that it does not count $I_t$ and $I_u$ itself but reads out a value counted by a dedicated circuit, and the value is a basis for settings for a change of operating speed. The program is stored in a storage device, and in distribution, it may be stored on a storage medium such as a CD-ROM or a floppy disk.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for controlling operating speed of a processor in a computer, comprising the steps of:
   counting the number of executed instructions ($I_u$) in a user mode during a first predetermined period; and
   changing the operating speed of said processor based on said $I_u$.

2. The method according to claim 1, further comprising the steps of:
   recounting $I_u$ after execution of said changing step; and
   performing said changing step again.

3. The method according to claim 1, further comprising the steps of:
   counting the number of executed instructions ($I_{u2}$) in a user mode during a second predetermined period; and
   if the rate of change from said $I_u$ to said $I_{u2}$ is higher than a predetermined value, setting the operating speed of said processor to the predetermined value.

4. The method according to claim 1, further comprising a step of counting the total number of executed instructions ($I_t$) during a second predetermined period.

5. The method according to claim 4, further comprising a step of changing the operating speed of said processor by referring to said $I_t$.

6. The method according to claim 4, wherein said first predetermined period and said second predetermined period are the same.

7. The method according to claim 6, wherein said changing step includes a step of switching a change control mode of the operating speed by referring to a ratio of said $I_t$ and $I_u$.

8. The method according to claim 6, wherein said changing step includes a steps of switching the change control flow of the operating speed by referring to a ratio of said $I_t$ and $I_u$.

9. The method according to claim 6, further comprising a step of, after performing said changing step, changing the operating frequency of said processor by recounting said $I_t$ and $I_u$ and referring to a ratio of said $I_t$ and $I_u$.

10. A method for controlling operating speed of a processor in a computer, comprising the steps of:
    counting the number of executed instructions ($I_u$) in a user mode during a predetermined period;
    counting the total number of executed instructions ($I_t$) during said predetermined period;
    by referring to a ratio of said $I_t$ and $I_u$, switching a policy for changing the operating speed; and
    by referring to said policy, changing the operating speed of said processor.

11. A method for controlling operating speed of a processor in a computer, comprising the steps of:
    measuring a value of a first performance index during a first predetermined period;
    changing the operating speed of said processor;
    measuring a value of a second performance index during a second predetermined period; and
    by referring to measured values of said first and second performance indexes, changing the operating speed of said processor.

12. The method according to claim 11, further comprising the steps of:
    measuring a value of a power consumption index during a third predetermined period; and
    based on the value of said power consumption index, changing the operating speed of said processor.

13. The method according to claim 11, wherein each of said changing steps comprises changing the operating speed of said processor so that the performance is increased.

14. A method for controlling operating speed of a processor in a computer, comprising the steps of:
    measuring values of a performance index and a power consumption index;
    by referring to a ratio of the measured values of said performance index and said power consumption index, changing a policy for changing the operating speed of said processor; and
    by referring to said policy, changing the operating speed of said processor.

15. A method for controlling an operating speed of a processor in a computer, comprising the steps of:
    measuring values of a performance index and a power consumption index;
    calculating a value of an energy index from the measured value of said performance index and said power consumption index; and
    changing the operating speed of said processor so as to decrease the value of said energy index.

16. A computer comprising:
    a first counter for counting the number of instructions ($I_u$) in a user mode executed by a processor during a predetermined period; and
    a controller for changing the operating speed of said processor by referring to said $I_u$.

17. The computer according to claim 16, further comprising a second counter for counting the total number of instructions ($I_t$) executed by said processor during said predetermined period, wherein said controller changes the operating speed of said processor by referring to a ratio of said $I_u$ and $I_t$.

18. A computer comprising:
    a measuring device for measuring a value of a performance index of said computer; and
    a controller for changing an operating speed of a processor in said computer,
    wherein said measuring device measures a value of a first performance index during a first predetermined period, and said controller thereafter changes the operating speed of said processor, and after the change of said operating speed, said measuring device measures a value of a second performance index during a second predetermined period, and said controller changes operating speed of said processor by referring to measured values of said first and second performance indexes.

19. The computer according to claim 18, wherein said controller changes the operating speed of said processor so as to increase the performance by referring to values of said first and second performance indexes.

20. A computer comprising:
    a first measuring device for measuring a value of a performance index of said computer;
    a second measuring device for measuring a value of a power consumption index of said computer; and
    a controller for changing the operating speed of said processor by referring to a ratio of the measured values of said performance index and said power consumption index.

21. A computer comprising:
    a first measuring device for measuring a value of a performance index of said computer;

a second measuring device for measuring a value of a power consumption index of said computer; and a controller for calculating a value of an energy index from the measured values of said performance index and said power consumption index and changing the operating speed of said processor so as to decrease the value of said energy index.

22. A storage medium for storing a program for causing a processor in a computer to change its operating speed, said program comprising the steps of:

reading out a count of the number of executed instructions ($I_u$) in a user mode during a predetermined period; and by referring to said $I_u$, setting the operating speed of said processor.

23. The storage medium according to claim 22, said program further comprising a step of reading out a count of the total number of executed instructions ($I_t$) during said predetermined period, wherein said setting step includes a step of switching a control flow of said operating speed by referring to a ratio of said $I_t$ and $I_u$.

24. A storage medium for storing a program for causing a processor in a computer to change its operating speed, said program comprising the steps of:

reading out a count of the number of executed instructions ($I_u$) in a user mode during a predetermined period;

reading out a count of the total number of executed instructions ($I_t$) during said predetermined period; and by referring to a ratio of said $I_t$ and $I_u$, setting the operating speed of said processor.

25. A storage medium for storing a program for causing a processor in a computer to change an operating speed of said processor, said program comprising the steps of:

reading out measurement result of a first performance index during a first predetermined period;

instructing a change of the operating speed of said processor;

reading out the measurement result of a second performance index during a second predetermined period; and by referring to measured values of said first and second performance indexes, setting the operating speed of said processor.

26. A storage medium for storing a program for causing a processor in a computer to change an operating speed of said processor, said program comprising the steps of:

reading out measurement results of a performance index and a power consumption index; and by referring to a ratio of the measured values of said performance index and said power consumption index, setting the operating speed of said processor.

27. A storage medium for storing a program for causing a processor in a computer to change an operating speed of said processor, said program comprising the steps of:

reading out measurement results of a performance index and a power consumption index;

calculating a value of an energy index from the measured values of said performance index and said power consumption index; and setting the operating speed of said processor so as to decrease the value of said energy index.

* * * * *